US007624277B1

(12) United States Patent
Simard et al.

(10) Patent No.: US 7,624,277 B1
(45) Date of Patent: *Nov. 24, 2009

(54) CONTENT ALTERATION FOR PREVENTION OF UNAUTHORIZED SCRIPTS

(75) Inventors: Patrice Y. Simard, Bellevue, WA (US); Richard Stephen Szeliski, Bellevue, WA (US); Josh Benaloh, Redmond, WA (US); Iulian D. Calinov, Redmond, WA (US); Julien D. Couvreur, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 519 days.

This patent is subject to a terminal disclaimer.

(21) Appl. No.: 10/373,926

(22) Filed: Feb. 25, 2003

(51) Int. Cl.
*G06F 21/00* (2006.01)

(52) U.S. Cl. .................. 713/182; 713/183; 713/184; 713/188; 726/5; 726/6; 726/26; 709/206; 709/207; 709/219; 709/225; 704/270

(58) Field of Classification Search .......... 713/182, 713/200, 183, 184, 188; 726/5, 6, 26; 709/219, 709/225; 704/270
See application file for complete search history.

(56) References Cited

U.S. PATENT DOCUMENTS

| 5,319,358 | A | * | 6/1994 | Martinez et al. ............ 345/469 |
| 5,319,722 | A | * | 6/1994 | Oki et al. .................... 382/293 |
| 5,491,749 | A | | 2/1996 | Rogaway |
| 6,195,698 | B1 | * | 2/2001 | Lillibridge et al. ......... 709/225 |
| 6,209,103 | B1 | * | 3/2001 | Schreiber et al. ............. 726/26 |
| 6,411,733 | B1 | * | 6/2002 | Saund ........................ 382/190 |
| 6,643,775 | B1 | * | 11/2003 | Granger et al. ............. 713/190 |
| 6,687,401 | B2 | * | 2/2004 | Naoi et al. .................. 382/190 |
| 6,782,510 | B1 | * | 8/2004 | Gross et al. ................. 715/533 |
| 7,065,652 | B1 | * | 6/2006 | Xu et al. ..................... 713/190 |
| 7,139,916 | B2 | * | 11/2006 | Billingsley et al. ......... 713/182 |
| 2002/0032869 | A1 | * | 3/2002 | Lamberton et al. ......... 713/200 |
| 2002/0194501 | A1 | | 12/2002 | Wenocur et al. |
| 2004/0093371 | A1 | * | 5/2004 | Burrows et al. ............. 709/201 |
| 2004/0123160 | A1 | * | 6/2004 | Mizrah ....................... 713/202 |
| 2004/0199597 | A1 | * | 10/2004 | Libbey et al. ............... 709/207 |
| 2004/0254793 | A1 | * | 12/2004 | Herley et al. ................ 704/270 |
| 2005/0027990 | A1 | * | 2/2005 | Ogawa ........................ 713/184 |
| 2005/0216771 | A1 | | 9/2005 | Malcolm |
| 2005/0229251 | A1 | * | 10/2005 | Chellapilla et al. ........... 726/23 |

OTHER PUBLICATIONS

Monica Chew and Henry S. Baird; "BaffleText: a Human Interactive Proof"; Published in Proceedings of the SPIE/IS&T Document Recognition & Retrieval Conf. X, Santa Clara, CA, Jan. 22-23, 2003; 11 Pages.*

(Continued)

*Primary Examiner*—Carl Colin
(74) *Attorney, Agent, or Firm*—Senniger Powers LLP

(57) ABSTRACT

Methods for preventing unauthorized scripting. The invention generates a human interactive proof to distinguish a human from a machine by generating a random set of characters and altering each of the characters individually to inhibit computerized character recognition. The invention also includes concatenating the altered characters into a character string to be rendered to a user as a test. The character string may be altered to further inhibit computerized character recognition. Other aspects of the invention are directed to computer-readable media for use with the methods.

50 Claims, 7 Drawing Sheets

OTHER PUBLICATIONS

Allison L.Coates, Henry S. Baird, Richard J. Fateman; "Pessimal Print: A reverse Turing Test"; IEEE 2001; pp. 1154-1158.*

Henry S. Baird, Kris Popat ; "Human Interactive Proofs and Document Image Analysis"; Springer-Verlag Berlin Heidelberg 2002; DAS 2002, LNCS 2423, pp. 507-518.*

Henry Baird et al; "Image Understanding & Web Security"; Palo Alto Research Center PARC; Feb. 19, 2003; pp. 1-53.*

Benny Pinkas, Tomas Sander; "Securing Passwords against Dictionary Attacks"; ACM Nov. 18-22, 2002; pp. 161-170.*

BBC News; "Computer Pioneer Aids Spam Fight"; BBC News; Jan. 8, 2003; "http://news.bbc.co.uk/1/hi/technology/2635855.stm" pp. 1-4.*

Lopresti et al., "Human Interactive Proofs for Spoken Language Interfaces," in Proc. of the Workshop on Human Interactive Proofs, Palo Alto, CA, Jan. 2002.

Blank, "A Practical Turing Test for Detecting Adbots," AI Update, Winter 2001, pp. 6-7, U.S.A.

Pinkas et al., "Securing Passwords Against Dictionary Attacks," Nov. 18-22, 2002, pp. 161-170, ACM Press, New York, U.S.A.

Lin et al., "Three-party Encrypted Key Exchange; Attacks and A Solution," ACM Operating Systems Review, Oct. 2000, pp. 12-20.

Matsumoto, "Human-Computer Cryptography: An Attempt," 1996, pp. 68-75, ACM Press, New York, U.S.A.

Monrose et al., "Authentication via Keystroke Dynamics," 1997, pp. 48-56, ACM Press, New York, U.S.A.

Deriche, R., Fast Algorithms for Low-Levil Vision, Jan. 1990, IEEE Transactions on Pattern Analysis and Machine Intelligence, vol. 12, No. 1, pp. 78-87, IEEE Computer Society, U.S.A.

Simard et al., "Transformation Invariance in Pattern Recognition—Tangent Distance and Tangent Propagation," in Neural Networks: Tricks of the Trade, Chapter 12, 1998, 40 pages, Springer, U.S.A.

Turing, "Mind A Quarterly Review of Psychology and Philosophy," vol. LIX, No. 236, Oct. 1950, pp. 433-460, Oxford University Press, U.S.A.

Ahn et al., "Telling Humans and Computers Apart (Automatically) or How Lazy Cryptographers do AI," pp. 1-11, Pennsylvania, U.S.A., Feb. 2004.

Workshop on Human Interactive Proofs, Jan. 9-11, 2002, California, U.S.A.

LeCun et al., "Gradient-Based Learning Applied to Document Recognition," Proceedings of the IEEE, 1998, pp. 1-46, U.S.A.

Bengio et al., "LeRec: A NN/HMM Hybrid for On-Line Handwriting Recognition," Neural Computation, vol. 7, No. 5, 1995, pp. 1-14, U.S.A.

Levin et al., "Dynamic Planar Warping for Optical Character Recognition," IEEE International Conference on Acoustics, Speech, and Signal Processing, vol. 3, Mar. 23-26, 1992, pp. III-149-III-152, U.S.A.

Viola et al., "Rapid Object Detection Using a Boosted Cascade of Simple Features," Accepted Conference on Computer Vision and Pattern Recognition, 2001, pp. 1-9, U.S.A.

Wolberg, "Digital Image Warping," IEEE Computer Society Press, 1990, California, U.S.A.

Spice, "Robot Solves Internet Robot Problem," Pittsburgh Post-Gazette, Oct. 21, 2001, 2 pages, Pennsylvania, U.S.A.

Pinkas, et al., "Securing Passwords Against Dictionary Attacks," Proceedings of the 9th ACM Conference on Computer and Communications Security, 2002, pp. 161-170, ACM Press, New York, U.S.A.

Bartels et al., An Introduction to Splines for Use in Computer Graphics and Geometric Modeling, Chapter 21, 1987, pp. 421-453, Morgan Kaufmann Publishers, Los Altos.

Danielsson, "Euclidean Distance Mapping," Computer Graphics and Image Processing, 1980, pp. 227-248, Issue 14, Academic Press, Inc.

Sullivan et al., "A New Major SETI Project Based on Project Serendip Data and 100,000 Personal Computers," Astronomical and Biochemical Origins and the Search for Life in the Universe, Proceedings of the Fifth International Conference on Bioastronomy = IAU Colloq. No. 161, 1997, 5 pages, Editrice Compository, Bologna, Italy.

Korel et al. "Version Management in Distributed Network Environment," 1991, pp. 161-166, ACM PRess, New York, U.S.A.

Tanenbaum et al., "Amoeba," Communications of the ACM, Dec. 1990, pp. 46-63, vol. 33, No. 12, ACM Press, New York, U.S.A.

Liu et al., "Building Reliable, High-Performance Communication Systems from Components," 1999, pp. 80-92, ACM Press, New York, U.S.A.

Baird et al., "Human Interactive Proofs and Document Image Analysis," Proceedings of the 6th IAPR International Workshop on Document Analysis Systems, Aug. 2002, 7 pages, Princeton, NJ, U.S.A.

* cited by examiner

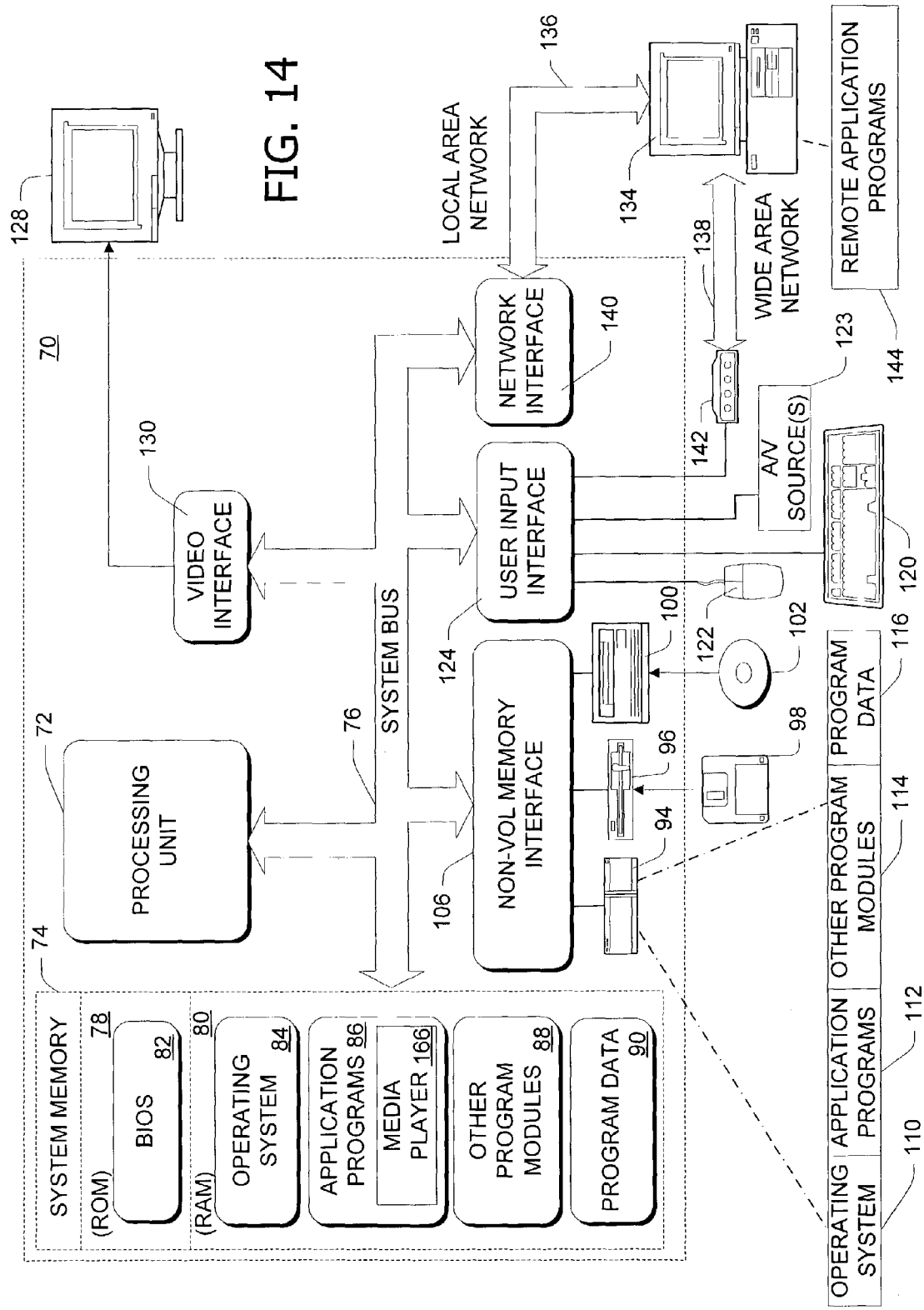

CONTENT ALTERATION FOR PREVENTION OF UNAUTHORIZED SCRIPTS

TECHNICAL FIELD

The present invention relates to the field of computer network environments. In particular, this invention relates to improvements in preventing scripts from running tasks that are supposed to be performed by humans for improving spam prevention and the like in such computer network environments.

BACKGROUND OF THE INVENTION

Web sites, or Internet sites, very often provide information, products, services, and the like to their users. A malicious user will sometimes employ a script to emulate human interaction with a web site. As is well known in the art, a script is an automated set of instructions. Every time the script is invoked, the commands are interpreted and executed. The script can adapt itself to the responses that the server gives.

Many web sites require users to "register" before their web servers will grant access to the users. Web site registration is one example of a task that is supposed to be performed by a human rather than a machine (i.e., by scripting). During registration, a user typically supplies personal information such as username, password, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

Using a presently available multi-site user authentication system (e.g., Microsoft® .NET™ Passport single sign-in service), a web user can maintain a single login ID (and associated password) for accessing multiple, affiliated web servers or services. Such a system permits the user to establish a unique account identified by, for example, an e-mail address.

Unfortunately, scripting permits a malicious user to emulate human interaction with a web site for registering a large number of new accounts associated with fictitious users. Because many e-mail services allow users to filter out unsolicited mass mailings (i.e., spam) based on the sender's address, running scripts to register new e-mail accounts enables the malicious user to continue sending spam from the new accounts in the face of such filtering. The new e-mail accounts also provide readily accessible space for storing illegal copies of software. Malicious users also run scripts against pages served by web servers in an attempt to guess passwords and mass-harvest public information (e.g., e-mail addresses). Moreover, malicious users are able to obtain free advertising in chat rooms and the like through the use of such script attacks.

Although several conventional techniques purport to prevent spam, these known techniques fail to address the problem of scripting attacks. For example, one anti-spam method, briefly mentioned above, attempts to distinguish desirable e-mail from spam by applying a set of rules to classify each piece of mail (e.g., flagging mail from a particular sender as spam). Rule-based classifiers tend to be ineffective mail filters and require continually modifying the rules. Another anti-spam technique involves requiring the sender to work a puzzle, the solution of which is attached to his or her sent mail as an "electronic postage stamp." In this instance, the recipient's mailbox must be set up to only accept mail that includes such a stamp. Other systems require generating digital signatures and the like for e-mail.

Those skilled in the art are familiar with the concept of "Turing tests" for interrogating two unseen respondents, a human and a computer, to try to determine which of the two is the computer. CAPTCHA (Completely Automated Public Turing test to tell Computers and Humans Apart) is a well-known project that creates puzzles designed to be solvable only by humans for the purpose of distinguishing humans and computers over a network. Typically, the puzzles involve having the user read a sequence of characters from a visually cluttered image. Further information on CAPTCHA is available at "www.captcha.net".

In the original Turing test, a human asks questions of another human and a machine to distinguish between the two. Recent interest has turned to developing systems that allow a computer to distinguish between another computer and a human. This enables the construction of automatic filters to prevent automated scripts from utilizing services intended for humans. In addition to being called CAPTCHAs, such tests are sometimes referred to as HIPs (Human Interactive Proof or Human Interaction Proof). Typical CAPTCHAs or HIPs involve text recognition, visual pattern recognition, image processing, and audio recognition challenges.

Unfortunately, advances in optical character recognition have reduced the effectiveness of existing Turing-type challenges. Also, there is little cost for an automatic attacker that only fails most of the time. Even if an automated script succeeds in defeating a challenge just 1% of the time, the cost of failures and repetitions is relatively low for a machine.

In light of the foregoing, further improvements are needed for preventing script attacks from successfully running a repetitive task that is supposed to be performed by a human. In addition to providing significant cost savings and improved security, such a solution is useful to help prevent spam, software piracy, and other malicious attacks.

SUMMARY OF THE INVENTION

The invention meets the above needs and overcomes one or more deficiencies in the prior art by providing improved Turing-type tests for distinguishing human users from machine users. In one embodiment, the invention utilizes an altered image or sound that can be easily understood by a human but that is difficult for a computer to reliably read without application of expensive techniques. The altered content (e.g., an image or sound challenge) helps protect a server from unauthorized scripts and the like. In particular, the invention involves improved methods for altering the content to make the challenge more difficult, expensive, and unpredictable for a computer to read yet easily readable by a human. By including an altered image or sound as a challenge in a web page and making the submission of the page dependent on a correct answer to the challenge, the invention denies a script running against the web page. In other words, the invention prevents a script from successfully running a repetitive task that is supposed to be performed by a human. According to the invention, a displayed image challenge presents a sequence of random characters generated on the fly using a random character generator. The invention involves improved techniques for altering content in a human interactive proof, including randomly selecting characters in an image, warping both the individual characters and the image, thickening and thinning the characters, and adding random arcs to the foreground and background of the image. The invention also filters the generated string through an offensive word list and provides configurable string lengths and difficulty factors. The invention yields significant reductions in spam, software piracy, and operating costs and yields significant improvements in security. The cost savings are particularly significant for large-scale web services, such as web-based e-mail services. Moreover, the features of the present invention described herein are less laborious and easier to implement than currently available techniques as well as being economically feasible and commercially practical.

Briefly described, a method embodying aspects of the invention generates a human interactive proof for use in distinguishing a human from a machine. The method includes generating a random set of characters and altering each of the characters individually to inhibit computerized character recognition. The method also includes concatenating the altered characters into a character string to be rendered to a user as a test.

In another embodiment, the invention is directed to a method for generating a human interactive proof for use in distinguishing a human from a machine. The method includes selecting a plurality of characters from a predefined set of available characters and altering each of the selected characters individually to inhibit computerized character recognition. The method also includes concatenating the altered characters into a string to be rendered to the user as a test and then altering the character string to further inhibit computerized character recognition.

Another method embodying aspects of the invention prevents unauthorized automated access to a server coupled to a data communication network. The method includes generating a random set of characters, altering each of the characters individually to inhibit computerized character recognition, and concatenating the altered characters into a character string. The method also includes delivering the character string to a client for rendering to a user as a test when the user requests access to the server via the client. According to the method, the client is also coupled to the data communication network. The method further includes receiving a response to the test from the user via the client and granting access to the server via the client if the received response verifies the user.

Yet another embodiment of the invention is directed to a computer-readable medium storing a data structure for use as a test to distinguish a human from a machine. The data structure includes a plurality of human-readable textual characters randomly selected from a predefined set of available characters. The characters are individually altered to inhibit computerized character recognition. The altered characters are concatenated into a character string to be rendered to a user. The character string is altered to further inhibit computerized character recognition.

Computer-readable media having computer-executable instructions for performing methods of sharing information embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 14 is a block diagram illustrating components of a computer for use with the present invention.

Corresponding reference characters indicate corresponding parts throughout the drawings.

DETAILED DESCRIPTION OF THE INVENTION

Figure 1:
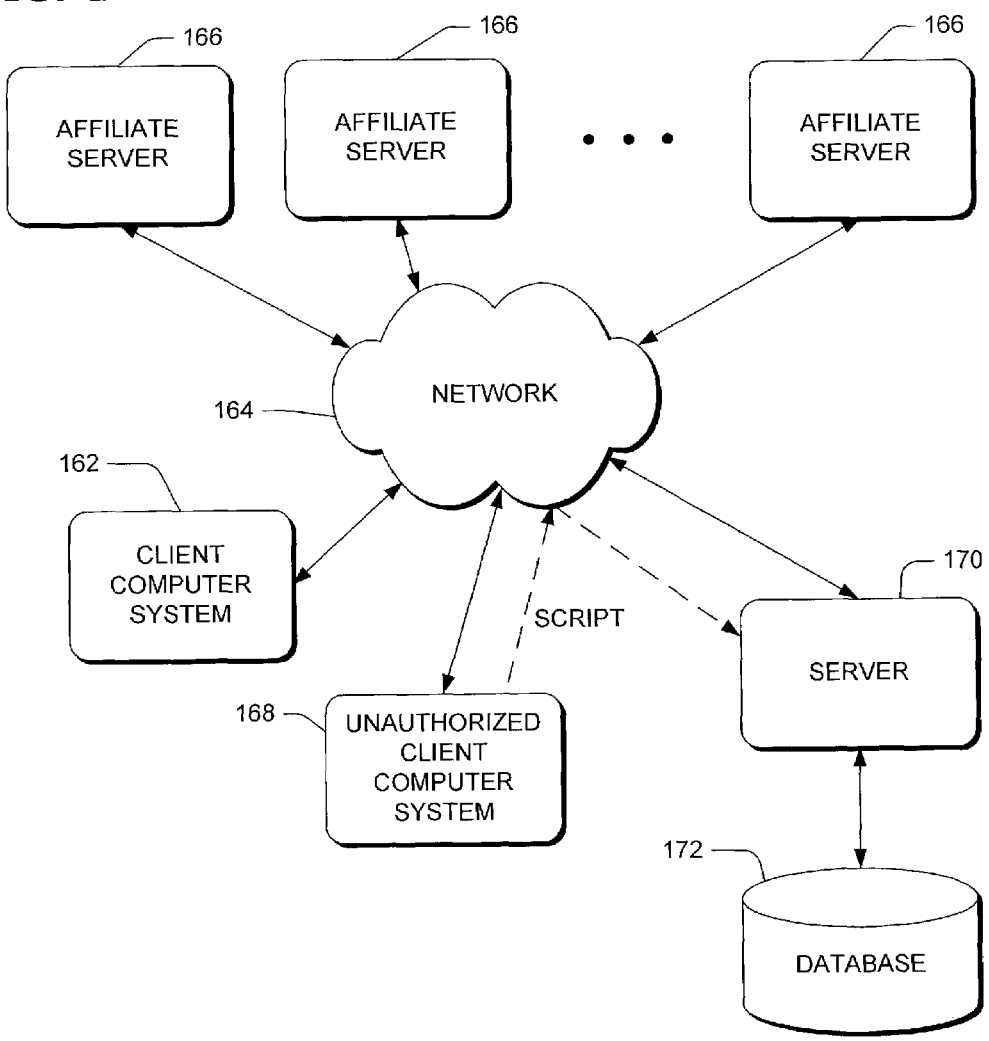
FIG. 1 is a block diagram illustrating a network environment in which the present invention is utilized according to one embodiment of the invention.

Referring now to the drawings, FIG. 1 illustrates an exemplary network environment in which the present invention may be utilized to render script attacks ineffective for performing repetitive tasks that are supposed to be performed by humans. Several situations can arise, particularly in connection with the Internet, in which it is important to distinguish a human user from a machine (e.g., conducting online polls, requesting accounts, receiving undesired e-mails, spamming chat rooms). In this instance, FIG. 1 diagrammatically shows cross-internet collaboration between web sites as part of a distributed, multi-site user authentication system (e.g., Microsoft® .NET™ Passport sign on service). Such services provide a user with the ability to access one or more participating Web sites or resources with a single sign-in. Although the participating sites (referred to as "affiliates" or "affiliate sites") maintain control over permissions, they use the authentication service rather than hosting and maintaining their own proprietary authentication systems. In the example of FIG. 1, the invention is described in the context of preventing automated registration with the multi-site user authentication system. It is to be understood, however, that the invention is applicable in any environment in which a user seeks access to a network server.

One or more client computer systems 162 are coupled to a data communication network 164 in FIG. 1. In this example, the network 164 is the Internet (or the World Wide Web). However, the teachings of the present invention can be applied to any data communication network. Multiple affiliate servers 166 are also coupled to network 164. In turn, the client computer systems 162 can access the affiliate servers 166 via network 164. Affiliate servers 166 are also referred to as "web servers" or "network servers."

FIG. 1 also illustrates an unauthorized user at client computer system 168. Most web sites are designed to interact with humans. However, human interaction with a web site can be very easily emulated with the use of scripting by an unauthorized user. A server has no reliable way of knowing when it interacts with a human versus a machine. Malicious users, for example, such as the one at client computer 168, run scripts against pages served by web servers for a variety of purposes (e.g., registering many new accounts to fictitious users, attempting to guess passwords, mass harvesting of public information such as e-mail addresses, abusing mail services for spam, free advertising in chat rooms, and the like).

Prior to executing an authentication process, both the user of client computer system 162 and the operator(s) of affiliate servers 166 "register" with a server 170 (e.g., an authentication server). The server 170, also coupled to network 164, allows communication between itself and client computer systems 162 and web servers 166. In this example, the unauthorized user, represented by client computer system 168, attempts to run a script to automatically register a large number of accounts with server 170. In general, this registration is a one-time process that provides necessary information to server 170. The user of client computer system 162 registers with server 170 by providing information about the user and/or client computer system 162, such as, the user's name, mailing address, and e-mail address. As part of the user registration process, the user is assigned (or selects) a login ID, which is a common login ID, used to access any affiliate server (e.g., server 166). The login ID may also be referred to herein as a "username," "member name," or "login name".

Additionally, the user selects a password associated with the login ID that is used for authentication purposes. After registering and logging into server 170, the user can visit any affiliate server 166 (i.e., affiliate servers that are also registered with the same authentication server) without requiring any additional authentication and often without re-entering user information that is already contained in the associated user profile.

As shown in FIG. 1, a database 172 (e.g., an authentication database) is coupled to server 170. The database 172 contains, for example, information (i.e., credentials) necessary to authenticate a user of one of the client computer systems 162 (as well as other users on the network).

Although referred to as an "authentication server," server 170 in the illustrated embodiment is also a web server capable of interacting with web browsers and other web servers. In this example, server 170, client computer systems 162, and web servers 166 communicate data among themselves using the hypertext transfer protocol (HTTP), a protocol commonly used on the Internet to exchange information. Although the database 172 is shown as a single storage unit separate from server 170, it is to be understood that in other embodiments of the invention, database 172 may be one or more memories contained within or separate from server 170. In a federated environment, for example, a plurality of authentication servers such as server 170 may be used to provide authentication.

The present invention involves the use of challenges (also referred to as "tests"), including altered images or sounds, for script prevention in certain areas of operations in a web site. An appropriately altered image, or sound, may be easily understood by humans but can be very difficult for a computer to reliably read without application of expensive techniques. By including such an image or sound as a challenge in a web page and making the submission of the page dependent on a correct answer to the challenge, the invention reasonably deters scripts from running against web pages.

Figure 2:
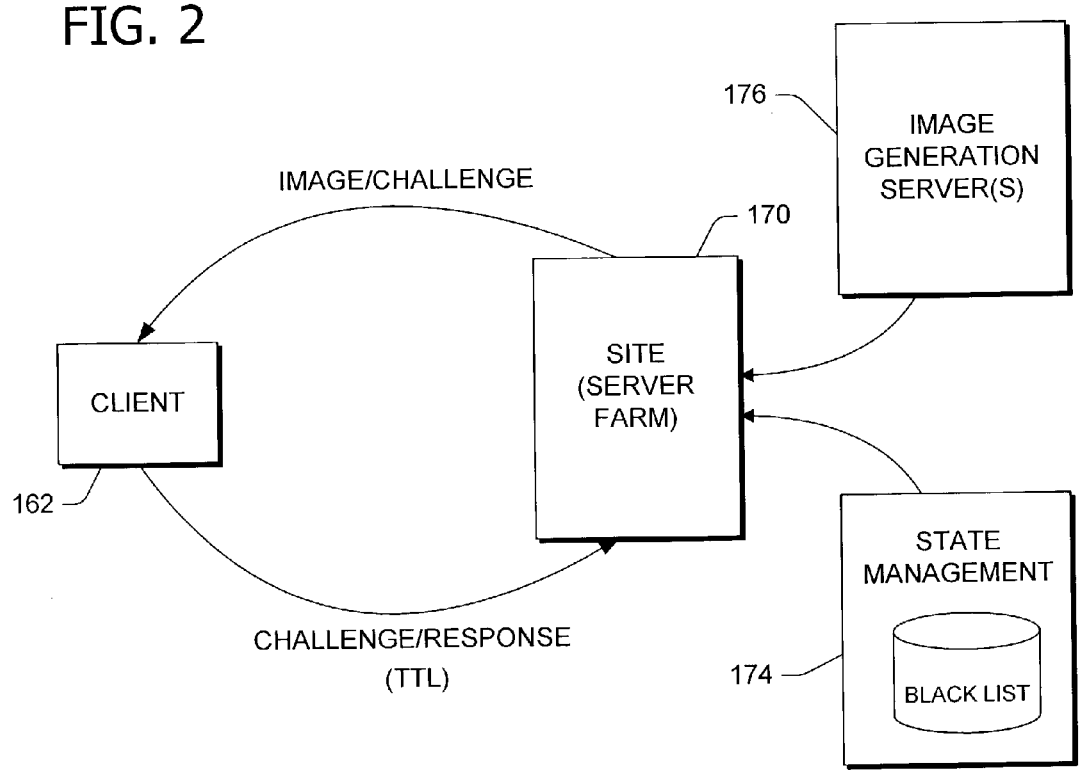
FIG. 2 is a block diagram illustrating a computer network implementing an image challenge according to one embodiment of the invention.

Referring now to FIG. 2, server 170 first delivers a challenge to be rendered to the user by client 162. For instance, server 170 delivers an altered character string to the user as an image test. In one embodiment of the invention, one or more image generation servers 176 coupled to server 170 generate a random character string image "on the fly," i.e., in real-time on a per request basis. Even if the same sequence of characters is reused, the image will have a different look or footprint due to the randomness involved in generating the image. It is further contemplated that server 170 as shown in FIG. 2 may be one or more server computers (i.e., a server farm). Image generation servers 176 are shown separately for convenience but may be part of the server farm shown at server 170.

The server 170 in FIG. 2 maintains a "black list" in an associated memory 174. The memory 174 represents, for example, a SQL database, a persistent store, or any one of many known means for storing information. For example, database 172 embodies memory 174. In this embodiment of the invention, the black list, or state management, database 174 stores successful responses previously submitted by the user to prevent their re-use. Commonly assigned application Ser. No. 10/374,036, entitled "Prevention of Unauthorized Scripts" and filed concurrently herewith, the entire disclosure of which is incorporated herein by reference, discloses state management involving use of a black list. As before, the database 174, which is shown as a single storage unit separate from server 170, may be one or more memories contained within or separate from server 170 in other embodiments of the invention.

The present invention takes advantage of the fact that an appropriately altered image or sound may be difficult for a computer to reliably read without application of expensive techniques but may be very easily understood by humans. By including such an image or sound as a challenge in a web page and making the submission of the page dependent of a correct answer to the challenge, we can reasonably prevent scripts from running against web pages.

Specifically, requiring the user to recognize a string of randomly distorted characters can distinguish the user from a machine. As described in greater detail below, various embodiments of the invention use different image alteration techniques. Generally, the displayed image is made up of a sequence of characters that are supposed to be read by a human. In this regard, an image is a visual representation but many aspects of the invention are applicable as well to a sound representation. To pass the challenge, the user must type in the correct corresponding ASCII string. Unlike many other systems, the present invention takes advantage of the assumption that segmentation is much more difficult than individual character recognition. Advantageously, image challenges created in accordance with the invention present hard segmentation problems that humans are particularly apt at solving but computers are not. As used herein, "segmentation" and "recognition" refer to computerized character recognition, either for segments or individual characters, respectively.

Construction of a HIP (Human Interactive Proof or Human Interaction Proof) that has practical value is difficult because the challenge must be more than just somewhat successful at distinguishing a human from a machine. In practice, a HIP must make the cost of an automated attack high enough to discourage repeated guessing. In one sense, a HIP is successful if the cost of answering challenges with a machine is higher than the cost of soliciting humans to perform the same task.

Those skilled in the art will recognize that generating a HIP (Human Interactive Proof or Human Interaction Proof) is a "synthesis" task while breaking the HIP is an "analysis" task. For computers, performing synthesis is usually orders of magnitude easier than performing analysis. There are many synthesis tasks that may be appropriate as HIPs. For example, identifying textual characters is a particularly useful visual challenge. Letters/digits have less ambiguity and are more language independent than other object names and virtually every computer has primitives to draw them on a bitmap. State of the art optical character recognition (OCR) algorithms, however, present a problem for conventional visual challenges of this type. Those skilled in the art also understand that classification tasks such as character recognition can be solved by training the learning algorithms of neural networks and the like on databases of characters. By learning in this manner, such OCR can be remarkably robust, even for cursive and highly distorted characters, and can recognize letters under fairly extreme conditions of distortion and noise.

Figure 3:
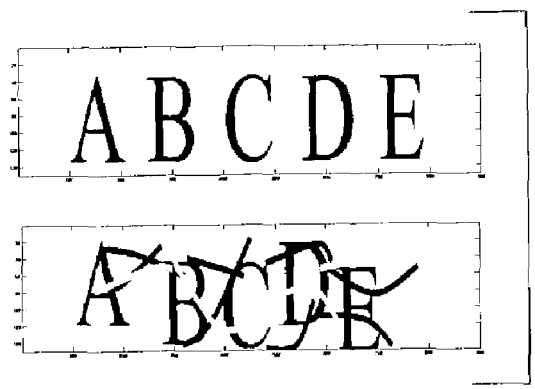
FIG. 3 illustrates an exemplary unaltered and altered image.

In one embodiment, the present invention overcomes state of the art OCR by augmenting the classification task (i.e., character recognition) with a segmentation task, which implies the need for action on segments of a visual challenge rather than merely individual characters. FIG. 3 is a relatively straightforward example of the difference between classification and segmentation in which an image with no distortions is compared to one in which the characters are randomly placed within the image and arcs are drawn in the foreground (2 per letter) and background (1 per letter) colors. In particular, the top portion of FIG. 3 contains the unaltered letters 'ABCDE'. The same letters at the bottom have been randomly moved and covered with arcs of both foreground and background color. Advantageously, processing the image in this manner inhibits an OCR system from effectively recognizing the character string.

According to the invention, image server 176 uses several image alteration techniques, described in detail below, for creating a HIP challenge to be rendered to the user. For example, server 176 subjects each character to several alterations when it generates the character, including random size, font alteration, and randomness factors. Server 176 generates each image using a random set of characters. Rather than using a dictionary of common words, server 176 generates the sequence "on the fly" using a random character generator. The set of available characters is configurable in the backend and, thus, can be changed at will. Advantageously, the invention provides a filter preventing offensive words from being randomly selected as part or all of the character string. When randomly generating sequences of strings, it is possible to end up with combinations of characters that result in offensive words. The invention filters the generated string through an offensive word list.

One aspect of the invention involves the use of elastic distortions to inhibit computerized character recognition. The image server 176 can generate simple distortions such as translations, rotations, and skewing by applying a distortion field to the image. Computing a new target location with respect to the original location for every pixel creates the distortion field. For instance, if $\Delta x(x,y)=1$ and $\Delta y(x,y)=0$, this means that the new location of every pixel is shifted by 1 to the right. If the displacement field were: $\Delta x(x,y)=\alpha x$ and $\Delta y(x,y)=\alpha y$, the image would be scaled by $\alpha$.

Figure 4:
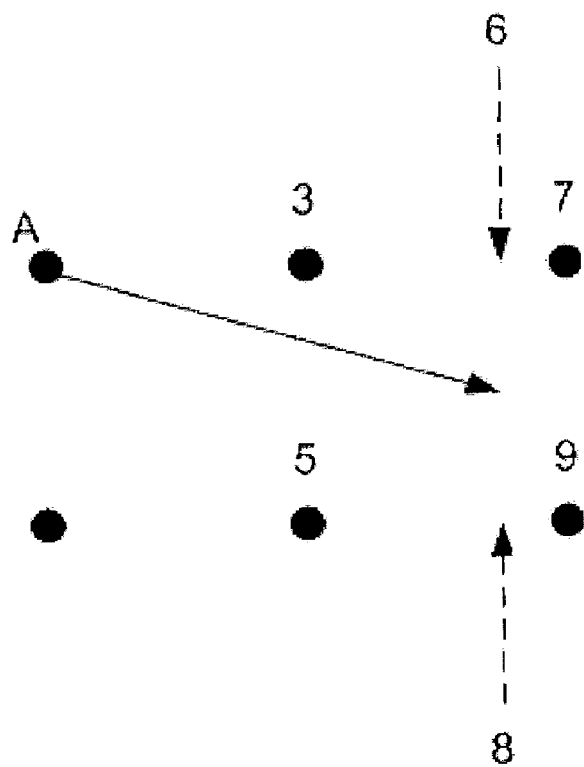
FIG. 4 is a diagrammatic representation of a displacement field calculation.

FIG. 4 diagrammatically illustrates how to apply a displacement field to compute a new image. In this example, the computation for 1 pixel, denoted by A, is similar for all pixels. Image server 176 computes the new values (like A) in a separate buffer to not interfere with the values being read. In the above example, the location of A is assumed to be (0,0) and the numbers 3, 7, 5, 9 are the gray levels of the image to be transformed, at the locations (1,0), (2,0), (1,−1) and (2,−1) respectively. The displacements for A are given by $\Delta x(0,0)=1.75$ and $\Delta y(0,0)=-0.5$ as illustrated in FIG. 4 by the arrow. The new gray value for A can be computed trying to evaluate a gray level at location (1.75,−0.5).

A simple way to evaluate the gray level is by doing a "bilinear interpolation" of the pixel values of the current image. Although other interpolation schemes can be used (e.g., bicubic and spline interpolation), the bilinear interpolation is one of the simplest. Interpolating the value horizontally, followed by interpolating the value vertically, accomplishes the evaluation. To compute the horizontal interpolations, image server 176 first computes the location where the arrow ends with respect to the square in which it ends. In this case, the coordinates in the square are (0.75, 0.5), assuming the origin of that square is bottom-left (where the value 5 is located). Server 176 then performs the horizontal interpolations with a linear interpolation between horizontally aligned values, and computes the new values at the horizontal location of the end of the arrow.

In this example, the new values are: $3+0.75\times(7-3)=6$; and $5+0.75\times(9-5)=8$. Then, server 176 performs a vertical interpolation between these values using the vertical location of where the arrow ends. In this case: $8+0.5\times(6-8)=7$. This means that the new value of A becomes 7. A similar computation can be done for all pixels. If a displacement ends up outside the image, a background value (e.g., 0) is assumed for all pixels outside the given image.

Figure 5:
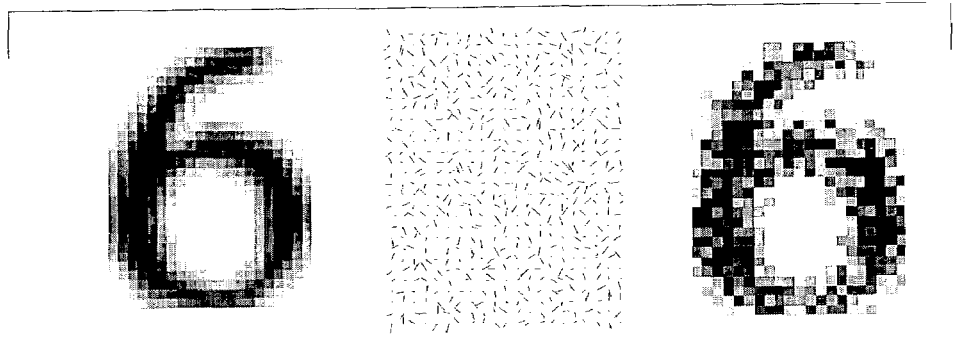
FIGS. 5, 6, and 7 illustrate alternative elastic distortions of individual characters.

The image server 176 can generate more subtle distortion by using more interesting displacement fields. For instance, the displacement field is random in one embodiment of the invention. FIG. 5 illustrates an original image of a textual character (i.e., the numeral 6). In addition, FIG. 5 shows a random displacement field according to the invention and the resulting distorted image when server 176 applies the random displacement field to the original image.

Figure 6:
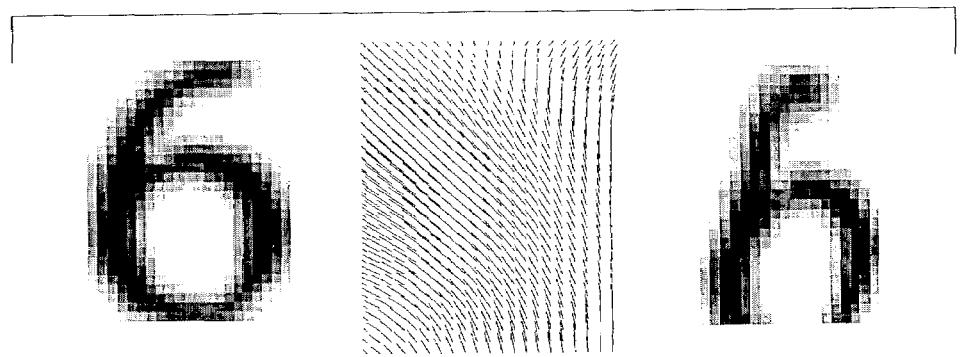
Figure 7:
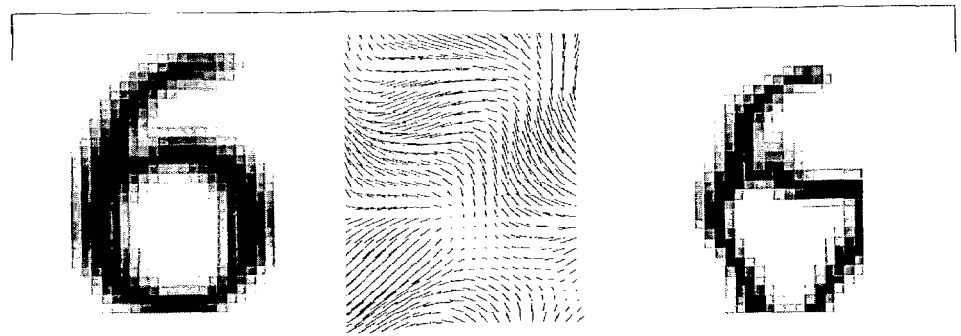

Referring to FIG. 6, image server 176 applies other types of distortion by filtering the random field. For instance, if the random field is convolved with a Gaussian (e.g., with 8 pixel standard deviation) and the field is multiplied by 16 (after being normalized to a max of 1 pixel displacement), the distortion of FIG. 6 results. Other values of sigma yield different deformations. For example, a random distortion field having the values of sigma=4 and intensity=16 yields the distorted image of FIG. 7.

It is to be understood that image server 176 could apply other types of filtering when generating the Turing-type challenges described herein. For instance, the vector field can be convolved very efficiently with a box (1 over a square centered on the origin, and 0 everywhere else).

According to the invention, image server 176 generates the final image by concatenating the image of each randomly selected character, where each character is subject to random alterations as described above. The image contains a preset number of characters. In other words, the image contains a fixed length string but a backend configuration parameter allows for longer strings if the existing length becomes vulnerable to attacks.

Random rotations and translations are the simplest distortions of the characters but most good OCR software is generally insensitive to such distortions. For this reason, the present invention advantageously adds a general warping function. In one embodiment, server 176 computes a pair of warp fields by generating random (white) noise and then using a separable recursive low-pass filter. Two parameters control this step: the cut-off frequency of the low-pass filter and a scaling factor that multiplies the whole (normalized) field. The first parameter controls the smoothness of the deformation while the second parameter controls its intensity. These warp fields are then used to re-sample the originally rendered character bitmap using an inverse warping algorithm.

Figure 8:
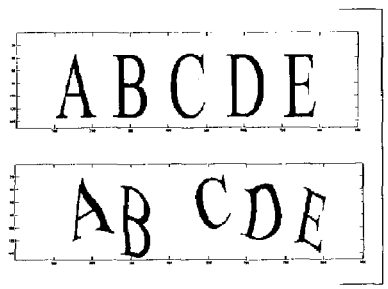
FIG. 8 illustrates a warped image.

FIG. 8 shows an image after applying a warp field. In this example, the image server 176 generates the resulting image by deforming the original image with a low-frequency random warp field.

To further inhibit character recognition, and make the segmentation task more difficult, image server 176 processes the concatenated image, i.e. the character string, to include random curved marks throughout the entire image and spanning multiple characters. Adding arcs, lines, and other marks of this type confuses optical character recognition software because the random arcs are potential character candidates and the true position of actual character is unknown. Typical OCR systems are therefore hampered by false positives. Humans are comparatively much better at filtering non-characters and are not nearly as affected by such distortions. Furthermore, not knowing the exact location of each character requires a large amount of additional computation to evaluate all the potentially valid positions. As described above, the present invention employs random marks for further obscuring the image. This inhibits an OCR system's ability to "learn" and, thus, inhibits such a system from recognizing the deformed letters.

Figure 9:
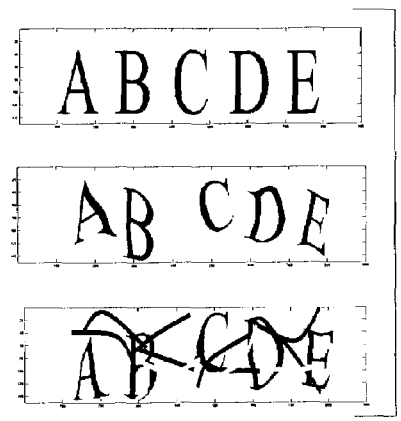
FIG. 9 illustrates a warped image having added random arcs.

According to the invention, server 176 draws arcs in both the foreground color and the background color. Depending on their color, the added marks either link or separate letter features. In one embodiment, server 176 draws each arc as a Cardinal spline with three control points. The end points of each arc are chosen (with random perturbations) to roughly bridge the space between adjacent characters. The midpoint is chosen as a random deflection of the average position of the endpoints, in order to give each arc some random curvature. FIG. 9 shows the resulting image after some random arcs have been superimposed.

Those skilled in the art recognize that letters can vary in thickness. Some fonts have a strict correlation between curvature and thickness. This relationship can be used to determine whether a portion of the image belongs to a character or an added arc. Distinguishing between characters and random marks would make computerized character recognition (segmentation, in particular) much easier. In other words, once the letters are identified, segmentation and, thus, classification becomes much easier. Therefore, it is important to make the segmentation of added arcs from letters difficult to prevent computerized recognition. Advantageously, the present invention avoids this problem by applying a thickness and thinning random distortion to the characters.

In one embodiment, image server 176 executes morphological algorithms using a distance transform (referred to as "dilation" and "erosion") to perform thickening and thinning. The distance transform is a simple algorithm that computes the closest black pixel to a given location for every location in a binary image. Server 176 performs a dilation of two pixels by setting every white pixel to black within a distance of one or two pixels from a black pixel. Image server 176 performs an erosion by setting every black pixel to white within a distance of one or two pixels of a white pixel. Moreover, dynamically changing the threshold of the distance to set a pixel to white or to black permits random dilation and erosion.

Figure 10:
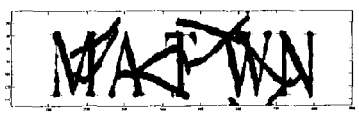
FIGS. 10 and 11 illustrate alternative thickening and thinning of characters in an image.

The server 176 accomplishes random dilation and erosion by first generating a smoothed random scalar field (using the same method as described above in connection with elastic distortion, with sigma and intensity being parameters). Then for every location, the value from the smoothed random field is used as the threshold to set the pixel to black. For instance, if at a given location, the value from the random field is 3 and the distance to the nearest black pixel is less than 3, then the pixel value is set to black (around that location, the dilation is 3). A similar algorithm can be used to erode the characters. Because this algorithm works on binary images, the characters may be rendered at a very high resolution in binary, and then scaled down to gray levels, to get smooth images. If the thickening field is multiplied by a smoothed random field, and the resulting field is applied to the image, the invention achieves desired thickness variations. To prevent characters from disappearing in places, image server 176 estimates the zero partial derivatives of the distance transform, which correspond to medial axes, and prevents the corresponding pixels from being changed by the erosion and dilation. An example of the resulting image is shown in FIG. 10.

In an alternative embodiment, the invention performs a tangent distance and tangent propagation known to those skilled in the art to compute a thickening or thinning distortion displacement given a gray level image. For example, P. Simard et al., "Transformation Invariance in Pattern Recognition—Tangent Distance and Tangent Propagation," International Journal of Imaging System and Technology, volume 11, Issue 3, pp. 181-194, 2001, discloses the use of tangent vectors and two classes of algorithms, "tangent distance" and "tangent propagation," which make use of transformation invariances to improve pattern recognition performance.

Figure 11:
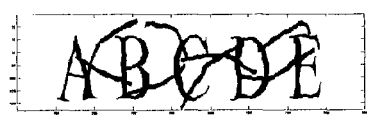

In another embodiment of the invention, image server 176 subjects the entire image to a local warping rather than dilation/erosion to thwart character recognition. This step is similar to the previous warping step described with respect to elastic distortion of individual characters. The difference is that the cut-off frequency of the low pass filter is higher, while the intensity is lower. The result is that warping is more localized and gives the visual appearance of changes in thickness. This process makes distinguishing arcs from pieces of letters more difficult but is still aesthetically pleasing and computationally inexpensive. The result of local warping on the image and arcs (with no other distortion) is shown in FIG. 11.

Figure 12:
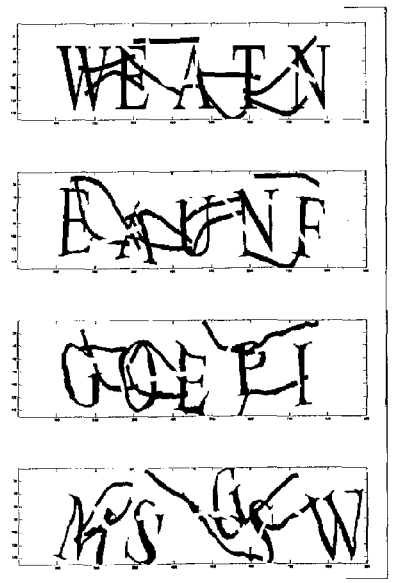
FIG. 12 illustrates altered images that are progressively more difficult to recognize by a machine.

FIG. 12 illustrates the effect of "tuning" the difficulty of the challenge. In this embodiment, the image server 176 adjusts the difficulty progressively. Using the techniques described above, for example, a single distortion parameter can be introduced to adjust the complexity of the image. All of the above alteration techniques can be configured to change the basic algorithms by which the final image is generated. When the technology is deployed there will be an initial relatively low level difficulty required to break it. The level of difficulty is called a hardness or difficulty factor and is configurable in the back end. As attack tools are trained to defeat the scheme the hardness factor can be increased, which makes it increasingly harder and more costly for attackers to defeat the scheme. Initially, the setting could be a low or no distortion. FIG. 12 shows the effect of various settings ranging from no distortion to high distortion.

Alternatively, image server 176 increases the difficulty of the challenge by increasing the size of the image, the number of arcs, the number of letters, and so forth.

Figure 13:
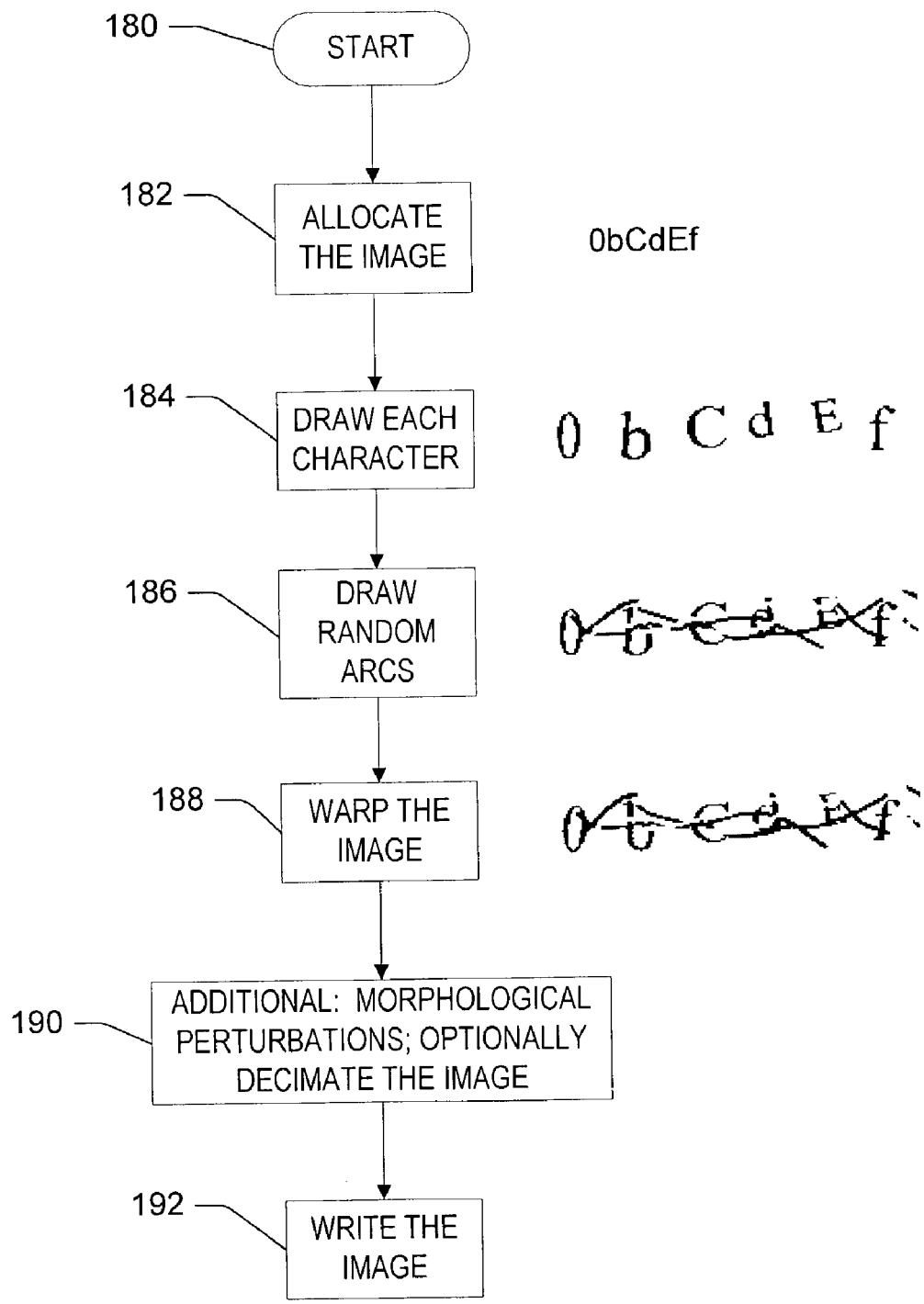
FIG. 13 is an exemplary flow diagram illustrating operation of an image server generating altered images.

Referring now to FIG. 13, computer-executable instructions implement several stages of image generation. After starting at 180, the image generation server 182 allocates the image. In the present example, the image contains a character string of 0bCdEf. Server 176 creates a blank image of size (width×height) and clears it to the color bkgd_ARGB. If supersampling is being used, the actual width and height values are multiplied by supersample, as are all subsequent units (character sizes, arc lengths, and widths, etc.). Next, server 176 proceeds to draw each character at 184. For each character in the string, a font is specified by:

(font_name, font_style, font_size)
at a location $(x_i, y_i)$, with $x = x_{margin} + k * font\_size + \Delta x$ $y_i = y_{margin} + \Delta y$ where
$x_{margin} = (width - n * font\_size)/2$
$y_{margin} = (height - font\_size)/2$
k: character index
n=|text| (length of the string text)
and $(\Delta x, \Delta y)$ are random displacements of magnitude±perturb_pos.

Before drawing, each character is independently and randomly rotated by an amount:

$\theta = \pm perturb\_angle$ degrees, and scaled (independently in x and y) by a relative amount $s = \pm perturb\_size/100$.

Next, this embodiment of the invention calls for drawing random arcs or other marks on the image, as indicated at 186. The image server 176 overwrites the image with some randomly selected marks, in both the foreground and background colors, for example, to create spurious connections between letters and spurious breaks within letters (e.g., n_arcs_frgd and n_arcs_bkgd arcs are drawn, respectively, in the foreground and background colors). If either of these parameters is negative, it is interpreted as the number of arcs to be drawn per character (actually, per character−1), as arcs are also drawn between characters.

Each mark, has a width arc_width, a maximum length arc_length, and a maximum deviation of arc_curve pixels from a straight line. In the alternative, the code ignores the arc_length parameter, and instead draws arcs between the characters, i.e., using the unperturbed x position half-way through a character as the anchor x value (value before random perturbation). The y value is chosen at random within the vertical margins of the image. Once the two endpoints have been chosen, a midpoint is computed halfway between the two endpoints, and perturbed by a random amount±arc_curve pixels. These three points are then used to draw an arc using a graphics device interface. For example, the Cardinal spline primitive used by GDI+, the graphics device interface for Microsoft® Windows® XP is suitable for arc drawing. This interface, now referred to as Avalon, is part of the Microsoft® .NET™ framework.

The image server 176, proceeding to 188, further obscures the image by "warping" it. In this stage, server 176 warps the image around using a randomly generated flow field. Server 176 creates this field by generating random white noise of magnitude warp_magnitude, and then filtering using a separable double exponential filter with a blur size of warp_blur pixels. Alternatively, the "warping" can be done before drawing the arcs to make the warping of the letters independent of the warping of the arcs. In this case, steps 188 and 186 are permuted.

The final distortion stage at 190 uses morphological perturbations (i.e., erosion and dilation) to locally thicken or thin characters to make machine reading of the characters even more difficult. Note that since these kinds of morphological images operate on binary images, the colorized image above is first converted to a binary foreground/background image, and then back-converted to color. For this reason, supersampling may be used in order to avoid strong aliasing ("jaggies") in the final image.

In the alternative, the invention provides for optionally decimating the image. If super-sampling is being used (supersample>1), decimate the image (currently using a bilinear filter) to bring it back to the original desired resolution. Note that if morphological perturbations are not being used, supersampling can be disabled (by setting supersample=1) to get faster performance.

Alternatively, thickness variations can be achieved by another warping of the image, with a higher frequency cut-off and lower intensity. In this case oversampling and undersampling are not necessary.

Additional security can be achieved by binarizing the image. This is done by forcing each pixel to take either a foreground value or a background value. This step removes information about transitions from foreground to background, which may be used to distinguish characters from arcs. The reason this might be possible is because characters are sometimes drawn with aliasing, which is typically not the case for arcs. In one embodiment, this additional security step may be performed immediately following the final distortion stage at 190.

Finally, the image server writes the color image file at 192. In one embodiment, a preferred format is PNG because it compresses this kind of simple image well. In another embodiment, the preferred format is JPEG because the lossy compression yields even smaller images, and additional security.

As described above, the image HIP presents a random string to the user, and the user has to read it and then enter it in a text box. The length of the string is configurable per interface and name space. The size of the image will stay the same regardless of the number of characters (e.g., maximum number of 10 characters). In one embodiment, acceptable responses contain the characters in both directions. For example, if the image shows "ABCDE" acceptable responses are both "ABCDE" and "EDCBA". This is done to prevent misunderstanding for bi-directional languages.

According to the invention, image server 176 generates a bitmap image of some random text (password) that a human can easily read but that is hard for a computer to read. The intended use is on Web pages that need to verify that a live user (as opposed to a Web Agent) is attempting to access the page. Image server 176 performs a series of image operations/transformations to go from the text to the final image. These transformations include: rendering each character with a randomly perturbed location, orientation and size; adding distracting graphics such as curved lines (foreground and background colors); adding distortions (such as warping and morphological erosion/dilation, . . . ); and writing the image out to disk.

The code is implemented as a C++ class, for example, with methods to set parameters, render a text string, and write out the resulting bitmap to a file. The main parameters controlling the class behavior are shown in APPENDIX A, and their usage is given below.

The foregoing provides a description of the invention primarily in the context of a visual challenge. It is to be understood, however, that aspects of the invention may be applied to an audio challenge as well. In one embodiment of the present invention, server 170 renders the audio challenge to the user by opening the default audio program of client computer 162 to play the character string for the user. The JAWS® screen reader software, available from Freedom Scientific of St. Petersburg, Fla., is suitable for playing the audible character string. The audible character string is not visible to the user but included, for example, as embedded text in the web page. The web page will typically consist of a Hypertext Markup Language (HTML) or other suitable markup language file with associated files for graphics and non-malicious scripts. In this instance, server 170 renders the audible character strings by specifying an alternate text attribute (e.g., ALT=?) in the markup language. Those skilled in the art are familiar with the use of the ALT characteristic, primarily in connection with text-based browsers.

In this embodiment, client computer 162 plays the audible character string in a selected language independent of the textual character string of the image test. In other words, the invention localizes the language for the audio challenge. The user need only visually recognize the textual characters whereas the user must be able to understand the audible characters. The browser program can be used to specify the desired language of the user (e.g., via a Hypertext Transfer Protocol (HTTP) header) or the user can specify the desired language (e.g., via an entry on the registration page).

FIG. 14 shows one example of a general purpose computing device in the form of a computer 70. In one embodiment of the invention, a computer such as the computer 70 is suitable for use in client computer system 162 (or unauthorized client computer system 168), server 170, or any of affiliate servers 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 10 illustrates operating system 84, application programs 86, other program modules 88, and program data 90.

The computer 70 may also include other removable/non-removable, volatile/nonvolatile computer storage media. For example, FIG. 14 illustrates a hard disk drive 94 that reads from or writes to non-removable, nonvolatile magnetic media. FIG. 10 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 14, provide storage of computer readable instructions, data structures, program modules and other data for the computer 70. In FIG. 10, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 10 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation, FIG. 14 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including cell phones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein to render one or more Turing-type tests to a user for distinguishing the user from a machine when the user requests access to a server (e.g., server 166).

Effective Human Interactive Proof systems are becoming an important component for many online services. By making the cost prohibitive for a machine to gain access without the expenditure of human capital, one can protect many services from unwanted automated intrusions. Gating services such as electronic mail, admission to chat rooms, and on-line polling can help preserve the integrity of these services. The techniques described herein leverage the human advantage over machines at segmenting text into its constituent characters. By exploiting these advantages, text-based challenges can be generated that are fairly easily read by humans but are well beyond the current capabilities of automated text recognizers. Challenges can be generated efficiently, and their difficulty can be easily adjusted in response to user feedback or technological advances.

Information in this document, including uniform resource locator and other Internet Web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A

```
struct SNoisyTextParams
{
    int m__widthF;              // final bitmap width
    int m__heightF;             // final bitmap height
    int m__supersample;         // super-sampling (anti-aliasing)
    WCHAR m__font__name[256];   // font name
    int m__font__style;         // union of (0: regular, 1: bold, 2: ital-
                                   ic)
    int m__font__size;          // final font size (in pixels)
```

APPENDIX A-continued

| | |
|---|---|
| int m_perturb_pos; | // maximum x-y perturbation (per character) |
| int m_perturb_angle; | // maximum rotation |
| int m_perturb_size; | // maximum scale change (percentage) |
| int m_n_arcs_frgd; | // number of arcs in foreground color |
| int m_n_arcs_bkgd; | // number of arcs in foreground color |
| int m_arc_length; | // horizontal length of arc (pixels) |
| int m_arc_curve; | // maximum deviation from line (pixels) |
| int m_arc_width; | // pen width (pixels) |
| int m_warp_magnitude; | // maximum displacement magn. at the center |
| int m_warp_blur; | // width of blur to smooth out displacements |
| int m_warp_magnitude_local; | // maximum displacement magn. at the center. |
| int m_warp_blur_local; | // width of blur to smooth out displacements |
| int m_morph_amount; | // amount to dilate/erode by (pixels) |
| int m_frgd_ARGB; | // foreground (text) color in ARGB format |
| int m_bkgd_ARGB; | // background color in ARGB format |

What is claimed is:

1. A method of generating a human interactive proof for use in distinguishing a human from a machine, wherein a server has a memory storing computer-executable instructions, for performing the method, said computer-executable instructions comprising:
   defining a configurable difficulty factor, said difficulty factor representing a level of difficulty in computerized character recognition;
   generating a random set of characters;
   altering each of the characters individually to inhibit computerized character recognition;
   concatenating the altered characters into a character string;
   generating an original image, said original image including the character string;
   performing an operation to the original image, said operation altering the original image according to the defined difficulty factor to further alter the character string and to further inhibit computerized character recognition, said operation adding random arcs to the original image, said random arcs including at least one arc that spans a plurality of the characters of the character string, said arc breaking each character of said plurality of characters into a plurality of segments; and
   generating a resulting image from the altered original image, said resulting image to be rendered to a user as a test.

2. The method of claim 1 wherein the character string comprises a string of human-readable textual characters to be read by the user and wherein the user responds to the test by repeating the string of textual characters via an input device after reading the character string from the resulting image.

3. The method of claim 1 wherein generating the random set of characters comprises randomly selecting a plurality of characters from a pre-defined set of available characters.

4. The method of claim 1 further comprising delivering the resulting image to a client for rendering to the user in response to a user request for access to a server via the client, said client and said server being coupled to a data communication network.

5. The method of claim 4 wherein altering the characters, concatenating the altered characters into the character string, generating the original image, performing an operation to the original image, and generating the resulting image occurs directly in response to the user request.

6. The method of claim 1 wherein adding random arcs to the image comprises altering a particular coloring of a portion of at least one of the characters of the character string to obscure the character string.

7. The method of claim 1 further comprising applying a random warp field to the original image to distort the original image including the character string.

8. The method of claim 1 further comprising applying a thickness and thinning random algorithm to the character string, said algorithm altering a particular coloring of a segment of at least one of the characters of the character string to vary line thickness of said segment.

9. The method of claim 8 wherein applying a thickness and thinning random algorithm comprises performing a morphological transformation on the original image including the character string.

10. The method of claim 8 wherein applying a thickness and thinning random algorithm comprises applying a localized warp field to the original image including the character string.

11. The method of claim 1 wherein altering the characters includes applying a displacement field to each of the characters to distort the characters.

12. The method of claim 11 wherein the displacement field is random.

13. The method of claim 1 wherein altering the characters includes moving each of the characters rotationally or translationally, or both, relative to an unaltered position.

14. The method of claim 1 wherein altering the characters includes randomly moving each of the characters relative to an unaltered position.

15. The method of claim 1 further comprising comparing the random set of characters against a predetermined list of offensive words and generating a substitute random set of characters if the compared random set of characters matches one of the offensive words from the list.

16. The method of claim 1 wherein one or more computer-readable storage media have computer-executable instructions for performing the method of claim 1.

17. The method of claim 1 wherein altering the characters includes skewing the characters relative to an unaltered character.

18. The method of claim 1 wherein the difficulty factor corresponds to an amount of distortion to the character string.

19. The method of claim 1 wherein the difficulty factor corresponds to a number of random arcs added to the original image.

20. A method of generating a human interactive proof for use in distinguishing a human from a machine, wherein a server has a memory storing computer-executable instructions, for performing the method, said computer-executable instructions comprising:
   defining a configurable difficulty factor, said difficulty factor representing a level of difficulty in computerized character recognition;
   selecting a plurality of characters from a predefined set of available characters;
   altering each of the selected characters individually to inhibit computerized character recognition;
   concatenating the altered characters into a character string, wherein each of the characters of said character string have a particular coloring;

performing an operation to the original image, said operation altering the original image according to the defined difficulty factor to further alter the character string and to further inhibit computerized character recognition, said operation adding random arcs to the original image, at least one of said random arcs altering the particular coloring of a segment of at least one of the characters of the character string at least one of said random arcs linking a plurality of the characters; and generating a resulting image from the altered original image, said resulting image to be rendered to a user as a test.

21. The method of claim 20 wherein the character string comprises a string of human-readable textual characters to be read by the user and wherein the user responds to the test by repeating the string of textual characters via an input device after reading the character string from the resulting image.

22. The method of claim 20 wherein the plurality of characters are selected randomly from the pre-defined set of available characters.

23. The method of claim 20 further comprising delivering the resulting image to a client for rendering to the user in response to a user request for access to a server via the client, said client and said server being coupled to a data communication network.

24. The method of claim 23 wherein altering the characters, concatenating the characters into the character string, generating the original image, performing an operation to the original image, and generating the resulting image occurs directly in response to the user request.

25. The method of claim 20 further comprising applying a random warp field to distort the original image including the character string.

26. The method of claim 20 wherein performing an operation to the original image includes applying a thickness and thinning random algorithm to the character string, said algorithm altering the particular coloring of a segment of at least one character of the character string to vary line thickness of said portion of said at least one character.

27. The method of claim 26 wherein applying a thickness and thinning random algorithm comprises performing a morphological transformation on the original image including the character string.

28. The method of claim 26 wherein applying a thickness and thinning random algorithm comprises applying a localized warp field to the original image including the character string.

29. The method of claim 20 wherein altering the characters includes moving each of the characters rotationally or translationally, or both, relative to an unaltered position.

30. The method of claim 20 wherein altering the characters includes randomly moving each of the characters relative to an unaltered position.

31. The method of claim 20 further comprising comparing the selected characters in the character string against a predetermined list of offensive words and selecting substitute characters from the predefined set of available characters if the compared characters match one of the offensive words from the list.

32. The method of claim 20 wherein one or more computer-readable storage media have computer-executable instructions for performing the method of claim 20.

33. The method of claim 20 wherein the difficulty factor corresponds to an amount of distortion to the character string.

34. The method of claim 20 wherein the difficulty factor corresponds to a number of random arcs added to the original image.

35. A method of preventing unauthorized automated access to a server coupled to a data communication network, said method comprising:

defining a configurable difficulty factor, said difficulty factor representing a level of difficulty in computerized character recognition;

generating a random set of characters;

altering each of the characters individually to inhibit computerized character recognition;

concatenating the altered characters into a character string;

generating an original image, said original image including the character string, wherein each of the characters of said character string have a particular coloring;

performing an operation to the original image, said operation altering the original image according to the defined difficulty factor to further alter the character string and to further inhibit computerized character recognition, said operation adding random arcs to the original image, at least one of said random arcs altering the particular coloring of a segment of at least one of the characters of the character string at least one of said random arcs linking a plurality of the characters;

generating a resulting image from the altered original image, said resulting image to be rendered to a user as a test;

delivering the resulting image to a client for rendering to a user as a test, said user requesting access to the server via the client, said client also being coupled to the data communication network;

receiving a response to the test from the user via the client; and granting access to the server via the client if the received response verifies the user.

36. The method of claim 35 wherein the character string comprises a string of human-readable textual characters to be read by the user and wherein the user responds to the test by repeating the string of textual characters via an input device after reading the character string from the resulting image.

37. The method of claim 35 further comprising applying a random warp field to the original image to distort the original image including the character string.

38. The method of claim 35 wherein performing an operation to the original image includes applying a thickness and thinning random algorithm to the character string, said algorithm altering the particular coloring of a segment of at least one character of the character string to vary line thickness of said segment of said at least one character.

39. The method of claim 38 wherein applying a thickness and thinning random algorithm comprises performing a morphological transformation on the original image.

40. The method of claim 38 wherein applying a thickness and thinning random algorithm comprises applying a localized warp field to the original image.

41. The method of claim 35 wherein altering the characters includes applying a displacement field to each of the characters to distort the characters.

42. The method of claim 41 wherein the displacement field is random.

43. The method of claim 35 wherein altering the characters includes moving each of the characters rotationally or translationally, or both, relative to an unaltered position.

44. The method of claim 35 wherein altering the characters includes randomly moving each of the characters relative to an unaltered position.

45. The method of claim 35 wherein one or more computer-readable storage media have computer-executable instructions for performing the method of claim 35.

46. A computer-readable storage medium having stored thereon a data structure for use as a test for distinguishing a human from a machine, said data structure comprising:

a plurality of human-readable textual characters randomly selected from a predefined set of available characters; said characters being individually altered to inhibit computerized character recognition, said altered characters being concatenated into a character string, said character string being included in an original image wherein each of the characters of said character string have a particular coloring, said original image being subjected to an operation to further alter the character string and to further inhibit computerized character recognition according to a configurable difficulty factor, said operation adding random arcs to the original image, at least one of said random arcs altering the particular coloring of a segment of at least one of the characters of the character string at least one of said random arcs linking a plurality of the characters, and said altered original image to be rendered to a user as a test having a level of difficulty in computerized character recognition represented by the difficulty factor.

47. The computer-readable storage medium of claim 46 wherein the user responds to the test by repeating the textual characters in the character string via an input device after reading the character string from the altered original image.

48. The computer-readable storage medium of claim 46 wherein the character string is further altered by a random warp field applied to the original image for distorting the character string.

49. The computer-readable storage medium of claim 46 wherein segments of the characters in the altered original image have varying line thickness for distorting the character string.

50. The computer-readable storage medium of claim 49 wherein line thickness is varied by a localized warp field applied to the original image including the character string.

* * * * *